US010026449B2

(12) United States Patent
Herberger et al.

(10) Patent No.: US 10,026,449 B2
(45) Date of Patent: Jul. 17, 2018

(54) SYSTEM AND METHOD FOR THEME BASED VIDEO CREATION WITH REAL-TIME EFFECTS

(71) Applicant: MAGIX AG, Berlin (DE)

(72) Inventors: Tilman Herberger, Dresden (DE); Titus Tost, Dresden (DE)

(73) Assignee: BELLEVUE INVESTMENTS GMBH & CO. KGAA (DE)

( * ) Notice: Subject to any disclaimer, the term of this patent is extended or adjusted under 35 U.S.C. 154(b) by 526 days.

(21) Appl. No.: 14/558,068

(22) Filed: Dec. 2, 2014

(65) Prior Publication Data
US 2015/0155008 A1 Jun. 4, 2015

Related U.S. Application Data

(60) Provisional application No. 61/910,570, filed on Dec. 2, 2013.

(51) Int. Cl.
| | |
|---|---|
| *H04N 5/92* | (2006.01) |
| *G11B 27/034* | (2006.01) |
| *H04N 5/77* | (2006.01) |
| *G11B 27/34* | (2006.01) |
| *H04N 9/82* | (2006.01) |

(52) U.S. Cl.
CPC ........... *G11B 27/034* (2013.01); *G11B 27/34* (2013.01); *H04N 5/772* (2013.01); *H04N 9/8211* (2013.01)

(58) Field of Classification Search
CPC ...... H04N 5/772; H04N 1/2112; H04N 5/907; H04N 2101/00; H04N 5/77

USPC ........................................................ 386/224
See application file for complete search history.

(56) References Cited

U.S. PATENT DOCUMENTS

| | | | |
|---|---|---|---|
| 8,483,549 B2 | 7/2013 | Steinberg et al. | |
| 2005/0053356 A1 | 3/2005 | Mate et al. | |
| 2005/0206751 A1* | 9/2005 | Manico ............... | G11B 27/034 348/239 |
| 2007/0089152 A1 | 4/2007 | Patten et al. | |
| 2007/0162855 A1* | 7/2007 | Hawk .................. | G11B 27/34 715/730 |
| 2008/0226253 A1 | 9/2008 | Steinberg et al. | |
| 2009/0174717 A1 | 7/2009 | Salisbury et al. | |
| 2009/0238538 A1 | 9/2009 | Fink | |
| 2011/0142420 A1 | 6/2011 | Singer | |
| 2011/0305433 A1 | 12/2011 | Singer | |

(Continued)

*Primary Examiner* — William C Vaughn, Jr.
*Assistant Examiner* — Daniel Tekle
(74) *Attorney, Agent, or Firm* — Crowe & Dunlevy; Terry L. Watt

(57) ABSTRACT

According to a preferred aspect of the invention, there is provided a system and method that allows a user to implement dynamic video editing in real time during the recording of a video. The user chooses a theme and associated styles/effects, etc., which are immediately applied to the video as it is recorded so that results are visible as soon as the recording is finished. The associated music defines the recording time of the video and changes in the character of the music are used to select effect markers positions at which the user will be able to apply or implement effects. The inventive system handles the selection, definition, implementation and placement of effects by the user and applies those effects in real time which provides an output at the conclusion of the recording that is immediately available for further use or distribution by the user.

38 Claims, 4 Drawing Sheets

(56) References Cited

U.S. PATENT DOCUMENTS

| | | |
|---|---|---|
| 2011/0311199 A1 | 12/2011 | Fay et al. |
| 2012/0054617 A1 | 3/2012 | Bachman et al. |
| 2012/0084654 A1 | 4/2012 | Lee et al. |
| 2012/0185772 A1 | 7/2012 | Kotelly et al. |
| 2013/0088513 A1 | 4/2013 | Deng |
| 2013/0124980 A1 | 5/2013 | Hudson et al. |
| 2013/0275312 A1 | 10/2013 | Claman et al. |

\* cited by examiner

SYSTEM AND METHOD FOR THEME BASED VIDEO CREATION WITH REAL-TIME EFFECTS

This application claims the benefit of U.S. Provisional Patent Application Ser. No. 61/910,570 filed on Dec. 2, 2013, and incorporates said provisional application by reference into this document as if fully set out at this point.

FIELD OF THE INVENTION

The present invention relates generally to the field of multimedia editing and, more generally, to generating full motion video works with theme based selection and application of effects during recording in real time.

BACKGROUND

In the last few years the environment of consumer digital devices has changed tremendously. Smart phones, Tablet PCs and other mobile devices have experienced a rise in distribution and popularity. Nowadays these devices are an integral part of the everyday life of millions of people all over the world. With the ability to get and distribute information quickly and easily; the ability to communicate with a multitude of people simultaneously and at any time and with the ready availability of usable software for these sorts of devices, many tasks that have been traditionally viewed as being performed exclusively on a desktop personal computer have been transferred completely or in part to the domain of mobile devices.

Furthermore the mobile devices' increased processing power and technical capabilities allow and, accordingly, provide completely new possibilities with respect to creating and working with media. Most of these new possibilities and usage scenarios take advantage of the mobile and dynamic character of the devices and provide media editing opportunities with usage scenarios that are different from the standard approaches to media editing on stationary computer devices.

One particular feature of mobile devices is the close integration between media handling (e.g., generation, and editing) and media distribution via social network platforms that are readily accessible from mobile devices. In cases of posting media items on social networking sites—the particular processing steps that produced the posted media items are usually not important to save or remember. Media processing steps that provide a one-time result give the editing and generation process on mobile devices a very dynamic and fast-paced feel. For example, it is common to offer the user the option of quickly applying any of a large number of effects before a digital image is uploaded. The effects will be applied and the modified image is distributed to the social networking sites without significant user interaction. Such approaches feature very quick and individual results that offer the user the option to create, edit and share individualized digital images in real time.

On the other hand, such an approach cannot, however, be found in combination with video media material. Dynamic real time theme based video generation, either before, during, or after recording video material is not provided on mobile devices. Of course, editing video material in general is tedious, e.g., cutting, reordering specific sequences, selecting background music, and adding individual effects to the video material are typically required. After all these actions, the final video needs to be rendered which, depending on the length and amount of effort that went into the editing process, might take from several minutes to several hours depending on the computational power of the device on which the rendering is performed.

Thus, what is needed is a system and method for computer devices, preferably mobile devices that supports a user who wishes to generate or record video material and edit it using well-known and easy-to-use processes of the sort offered in connection with digital photo images on video material. It would be useful if such a system provides a number of individual themes, selectable by the user, and wherein the themes comprise theme-specific music, intro, outro and multiple effects. It would further be useful if the user were to be in charge of selecting and incorporating the effects. It would also be useful if the applied effects could be viewed in real time, preferably during recording of the video material as the effects are applied.

Heretofore, as is well known in the media editing industry, there has been a need for an invention to address and solve the above-described problems. Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method of providing theme based real time video editing by allowing a user to be guided during the recording process of video material. The method will be carried out on mobile computer devices.

According to one embodiment, the instant invention will allow the user to create an output video in a single step by applying one or more predefined styles and associated music to a video as it is recorded. In this embodiment, the final output video will be finished and fully rendered when the recording ends. The user will be able to interact with a graphical user interface to specify the desired properties of the video generation process requirements that occur during recording of the video material according to the instant invention.

In a preferred arrangement, a user will be presented with a graphical user interface that will provide a selection of recording options. The options might include selection of a video style, selection of music associated with the style, selection of video effects, definition of the start and the end of the generated video, etc. The selection options, combined with the fact that the user is able to change his or her selections dynamically during the run time of the video recording, allows even the novice user to generate an output video easily and quickly. The user interaction with the instant invention will preferably be implemented via touch screen technology. That being said other interaction options via mouse or keyboard are also possible.

Even though a manual and dynamic interaction between the user and the device is the intended method of utilizing the instant invention, intelligent automatic settings for the application of the effects will also be provided in some embodiments. The selectable styles will preferably come predefined with at least one background music track, intro and outro settings and a plurality of user selectable individual special effects. The background music track, and therewith audio part of the style, will define the length of the resulting output video in some embodiments. Depending on the particular embodiment, the music track will replace the audio of the recorded video work and in other instances it will be added to it to create a composite audio track.

Additionally, in some embodiments a user selected video theme will contain a number of predefined marked positions in the audio material, with the appearance of the recorded video between each marker being controlled by a selected style. Each marker will be selected to coincide with a change in character or an "event" in the audio material. That is, each marker will be positioned to coincide with such events as changes in volume, tempo, etc., or to emphasize phrases in the lyrics, etc. The ultimate idea is to position the markers so that during recording and playback of the effects that might be insertable at the locations of these markers, the effects will be timed in some way to complement and/or match the audio.

These positions or markers define locations where the individual effects are to be applied by the user. The effects may not necessarily be full screen effects—the effect positions might also be used by the instant invention, depending on the theme, as markers informing the user to stop recording, e.g., to potentially suggest that the user change the orientation of the mobile device and continue with the recording process. The instant invention will preferably continuously apply the selected effects in real time during recording of the video after selection by the user. After the recording is stopped, an embodiment of the instant invention will provide a fully rendered output video as result.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DESCRIPTION OF THE PREFERRED EMBODIMENTS

Figure 1:
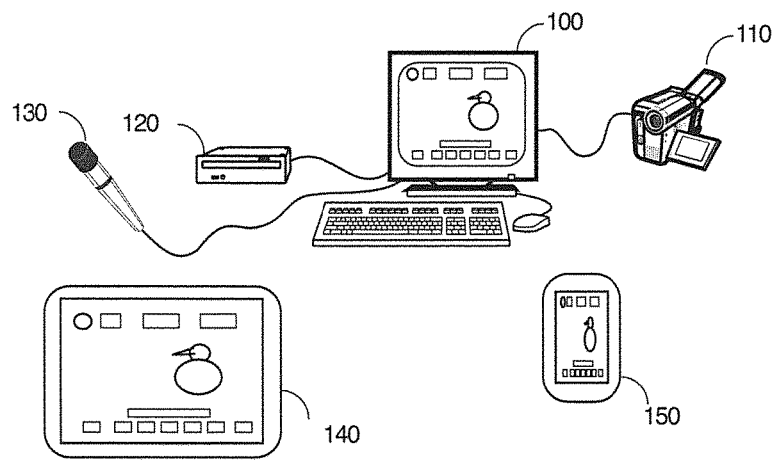
FIG. 1 depicts a general working environment of an embodiment of the instant invention.

Referring now to the drawings, wherein like reference numerals indicate the same parts throughout the several views, there is provided a preferred system and method for implementing dynamic theme based output video creation with real-time application of effects. This system and method allows for influencing the editing of video material directly during recording and providing an edited output video instantly after ending the recording process.

As is generally indicated in FIG. 1, at least a portion of the instant invention could be implemented in the form of software running on a computer 100. Such a computer will have some amount of program memory and hard disc storage (whether internal or accessible via a network) as is conventionally utilized by such units. Additionally it is possible that an external camera 110 of some sort be utilized with—and will preferably be connectible to—the computer so that video and/or graphic information can be transferred to and from the computer. Preferably the camera 110 will be a digital video camera, although that is not a requirement, as it is contemplated that the user might wish to utilize still images from a digital still camera in the creation of his or her multimedia work.

Further given the modern trend toward incorporation of cameras into other electronic components (e.g. in handheld computers, telephones, laptops, etc.) those of ordinary skill in the art will recognize that the camera 110 might be integrated into the computer or some other electronic device (e.g., a table 140 or cell phone 150) and, thus, might not be a traditional single-purposes video or still camera. Although the camera will preferably be digital in nature, any sort of camera might be used, provided that the proper interfacing between it and the computer is utilized.

Additionally a microphone 130 might be utilized so that the user can add voice-over narration to a multimedia work or can control his or her computer via voice-recognition software and additionally a CD or DVD burner 120 could be useful for storing content on writable or rewritable media. Additionally, it might also be possible, and is shown in FIG. 1, that the process of the instant invention might be implemented on portable tablet computer devices 140 or on mobile devices, such as smart phones 150.

Figure 6:
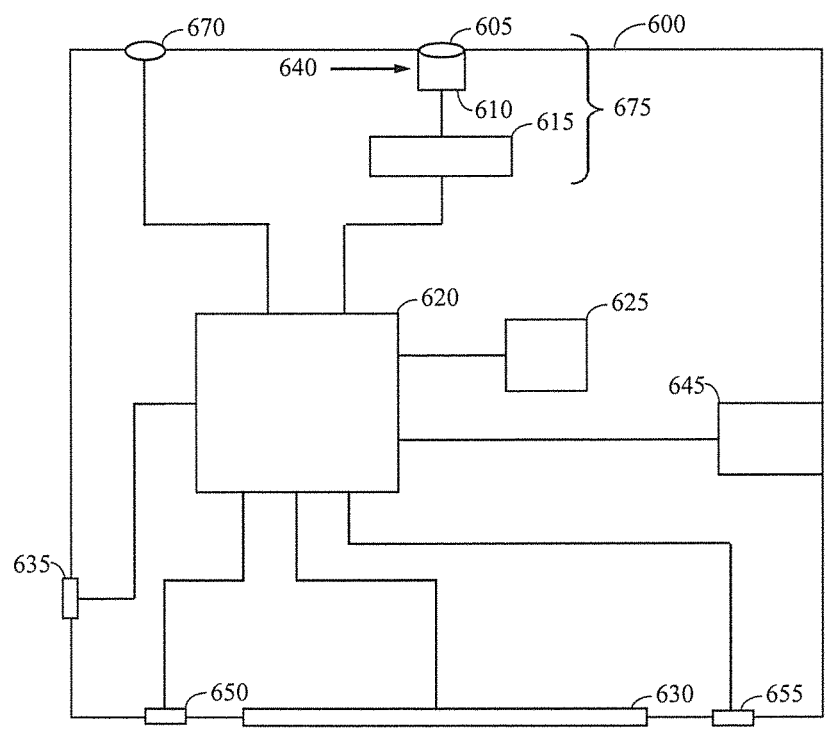
FIG. 6 contains an example of a hardware embodiment suitable for use with the invention.

Turning next to FIG. 6, contained in this figure is a hardware embodiment suitable for use with the instant invention. According to this example, a portable computing device 600 such as a digital camera, a cellular telephone, a tablet computer, etc., will be equipped with an integrated digital camera element 640 which comprises a lens 605 and sensor 610 (e.g., a CMOS or CCD sensor). In electronic communication with the digital camera element 640 may be a video or other graphic processor 615 which receives information from the sensor 610 and converts it to frames of video data and, in some cases, applies one or more signal processing algorithms to the raw video signal (e.g., anti-shake, noise reduction, color balancing/enhancement, etc.) before it is passed on to the CPU 620. Collectively, the camera element 640 and video processor 615 will be referred to as a video camera 675 hereinafter. Additionally, a microphone 650 will typically be provided to allow an audio track to be recorded simultaneously with the collection of the video.

In electronic communication with the video processor is a CPU 620 which is responsible for collecting video frames from the processor 615 and storing the captured video in nonvolatile storage 640 which might comprise a removable SSD memory card or other storage medium which is accessible by the CPU 620 according to methods well known to those of ordinary skill in the art. Additionally, the device 600 will contain some amount of internal memory 625 in which a software embodiment of the invention might be stored for subsequent execution by the processor 620. Additionally, there would typically be provided an external connector 635 (e.g., a USB or RS-232 connector) which would allow the device 600 to be linked to a desktop or other computer (not shown), which link might be used to transfer software and data (e.g., scene, effect, and music data) into the device 600 and/or video away from the device according to methods well known to those of ordinary skill in the art. In some embodiments, instead of, or in addition to, a hardware connection, 635 there might be provided wireless connection hardware (not shown).

Also included will typically be a LCD or other display 630 that is integral to the mobile computing device 600 and which would serve to present menus that are created by the instant invention, that allow the user to review the video, modify device settings, etc., as is commonly done in such devices. As indicated, that display 630 would typically be in electronic communication with the CPU 620. Additionally, in some instances there might be a separate hardware input module 650 which could take the form of some number of buttons, wheels, switches, etc., that would allow the user to respond to menu prompts, set device parameters, etc. In some embodiments, the display 630 might be touch sensitive and the hardware buttons, etc., might be replaced by similar on-screen functionality. In some embodiments there might be a separate speaker 655 which allows the user to hear music that is played by the device 600. Of course, those of ordinary skill in the art will recognize that instead of (or in addition to) the speaker 655 an audio port (e.g., a connector that supports a mini-plug) might be provided to allow the user to listen to theme-associated music via headphones, ear buds, etc., or via externally powered speakers. Thus, for purposes of the instant disclosure when the term "speaker" is used herein, that term should be broadly construed to include speakers that are integral to the device 600 as well as a port or connector for transmission of audio to a separate amplifier and/or speaker according to methods well known to those of ordinary skill in the art. Finally, it should be noted that although the CPU 620 is shown as a single element in FIG. 6, its functions might be divided among multiple discrete CPUs according to methods well known to those of ordinary skill in the art. As such, when the term CPU is used herein that term should be broadly construed to include any programmable object or combination of objects capable of carrying out the objects of the instant invention and, further, that term should include instances where the functionality is spread across two or more different processors that are in electronic communication with each other.

The approach to video generation taught by the instant invention is directed to obtaining user instructions and implement same in real time, which will give the user real time feedback with respect to video recording choices and, after stopping or ending the video generation, an instantly viewable result.

Figure 2:
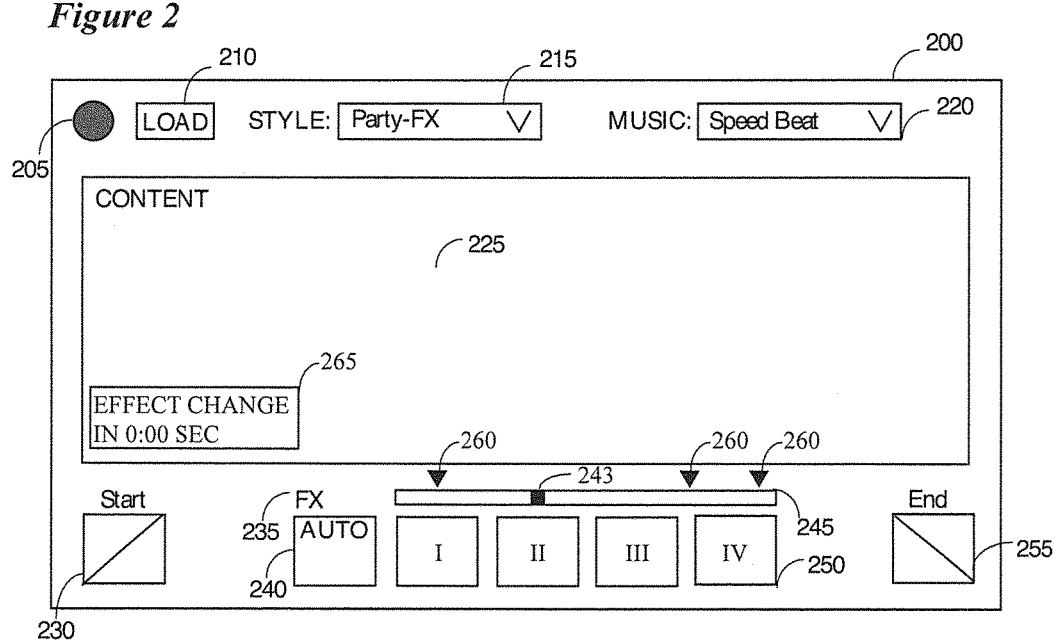
FIG. 2 illustrates a preferred graphical user interface of the instant invention according to one embodiment.

Turning next to FIG. 2, this figure contains an embodiment of a graphical user interface that might be presented to a user on a mobile device in order to allow that user to initiate a video recording. In the embodiment of FIG. 2, the user will be presented with a graphical user interface 200 containing controls for the settings supporting the video generation process. In an embodiment these controls and the associated settings will be selectable and changeable by the user at any time while the user is recording. However, due to the continuous nature of the process of the instant invention, the selections will not generally be reversible; instead some selections will only be changeable after restarting the recording process. The selections made by the user will be instantly incorporated in real time into the video that is being generated.

Continuing with the example of FIG. 2, the user will preferably start with the activation of the recording functionality 205 of the device. The instant invention provides a number of different editing themes and associated styles that will be selectable by the user by interaction with the corresponding drop down menu / user control 215. A number of predefined styles will be supplied, but the instant invention will also allow new styles to be added later. In some embodiments the new styles might be distributed via the Internet or other distribution venues.

Each style will contain at least dedicated background music. However, depending on the selected style, this background music might be comprised of only one particular music clip or a number of different music clips. The audio content of the style will be matched to and/or define the length of the output video. Additionally, the audio content will be marked at a number of different positions, with the markers defining time positions in the theme and music where the associated effects (if they have been assigned) are to be applied. As described previously, the markers will be chosen to enhance, highlight, reflect, etc., changes in the character of the music and/or to coincide with phrases in the lyrics. For example, markers might be positioned at the beginning or end of each verse, at the beginning of a chorus or bridge, at a point where the music changes key, tempo, chord structure, feel, etc. In short, the markers will be assigned to a particular audio work in such a way that the final video product will appear to have been created professionally in conjunction with that particular audio work. Of course, this approach is opposite to conventional video recordings where the video is first collected, the audio is applied, and effects are assigned after the fact to compliment the video action. For purposes of the instant disclosure, it should be understood that when it is said that the markers are chosen to be associated with a "change in character" of the music clip, that phrase should be broadly interpreted to mean that a marker has been chosen to be proximate to any of the foregoing (or other) changes in the lyrics and/or melody of the music.

The user control 220 provided in the graphical user interface of an embodiment is a drop down menu that will allow the user to select, change or de-select the background music and, depending on the selected style, the user might be able to select one particular type of background music clip out of multiple different available background music clips if such are supplied with the selected theme.

The largest part of the graphical user interface will be dedicated to displaying the content or showing the recording process 225. This aspect of the invention will often resemble the viewfinder of a video camera during the recording process with an added display of the selected effects. An embodiment of the instant invention additionally will contain a graphical element 245 that provides the user with the current 243 and total run time. In some embodiments, the time locations of the markers 260 (described more fully below) will be indicated on the timeline 245. Additionally, in some embodiments an on-screen countdown or other prompt 265 will be provided to allow a user to know how much longer it will be until the next marker will be reached. In some cases, rather than the time till the next marker, the time until the next effect change will be continuously displayed and updated. This might be useful where the user has not assigned an effect to every marker.

The graphical user interface of an embodiment will not contain control elements for pausing, forwarding, or rewinding the current video clip. This omission will tend to produce an individualized, different output video almost every time. This omission further encourages a focused approach by the user because, even though the instant invention is not primarily directed to professional editing, the user will want to approach the system with concentration and determination.

An embodiment of the user interface will further contain a start 230 user control, an effects ("FX") section 235, containing a user control defining an automatic setting 240 for the selectable effects and at least four individual user controls for at least four different effects 250 that are to be applied to the video clip in real time, sequentially or simultaneously. An end user control is also provided, that will allow the user to stop the editing process 255 by selecting this user control. In the current embodiment, the start functionality not only will initiate the recording of a video—depending on the selected style, the "start" control could implement transitions and effects that are applied simultaneously with starting the recording or starting the clip, e.g., providing an intro for the recording of the video.

Note that, for purposes of the instant disclosure, the term "effect" is intended to encompass traditional video effects (fades, wipes, transitions, animations, color changes, antishake, video overlays, etc.) as well as "instructional effects" where, for example, the user is instructed to perform some operation or task (e.g., change the camera orientation from vertical to horizontal, change the direction the camera is pointing, etc.). In some embodiments the task might take the form of allowing to optionally insert his or her own media into the recorded video at one of the marker positions (e.g., insertion of photographs, or previously recorded video material that are stored on the camera) with the net result being that the inserted media will appear within the live-recorded video work when the recording stops for the last time.

For the user control labeled "end" 255 the functionality will be similar in the embodiment of FIG. 2. Depending on the style, a specific transition will be provided which allows the user to not just end the recording or end playing the video clip, but also provides the user with a stylistically themed ending to the process.

The effects section 235 of the example in FIG. 2 will also provide a number of style dependent effects, wherein the instant invention allows the user to continuously and dynamically select and deselect individual effects during running time of the video or during recording time. The implementation of these effects during the recording process will be controlled by predefined time markers that come with the selected theme.

The background music that is part of the style will define the run time of a potential output video and the audio will also mark individual sections of an output video where the user will be able to initiate the placement of the available effects. These effects might be overlay effects, or effects with a specific run time. The user will be able to select multiple effects at once in some embodiments and every selection will be implemented immediately and shown to the user in connection with the recording.

Additionally, an effect need not be an actual full screen effect, or an effect that changes the perception (appearance) of the video. Some effects will correspond to time markers where the user might be instructed by the instant invention to temporarily stop recording and, for example, change the orientation of the recording device, insert his or her own previously stored media content into the ongoing video recording process (e.g., a picture or video stored in the digital camera, etc.) and afterwards continue the recording process. A mixture of such informational/instructional effects and video effects will preferably be provided with each style. The graphical user interface in some embodiments will be optimized for touch screen interaction, e.g., for implementation on mobile devices directed to providing a convenient way of video editing during recording of the video or during playback of the video. However, the use will not be limited to such devices or such interaction techniques.

Figure 3:
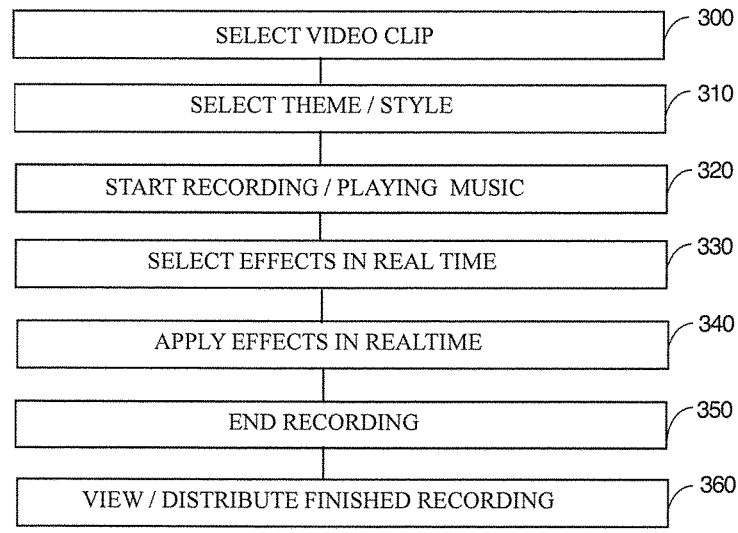
FIG. 3 illustrates a preferred general workflow of the instant invention from the standpoint of the user.

FIG. 3 provides a summary of the workflow of an embodiment that depicts the user interactions. In a first preferred step, in case the user intends to store the output video material using a particular filename, the user will select the output file name for the video clip 300 or allow the recording device name the file automatically. The output file might be stored within the internal memory of the device that creates the video, within an attached flash drive or memory (e.g., SD) card, or remotely (e.g., via WiFi, Bluetooth, etc.). All that is required is that the final video product be accessible subsequently so that it can be accessed and viewed by a user. Those of ordinary skill in the art will readily understand how this might be possible.

In the next step the user will select a desired theme 310 (and/or style if the theme has only one associated with it) and an embodiment will automatically initiate the recording process 320. During the recording session, the user will have the opportunity to dynamically select one or more style dependent effects 330. The selection of the intro and outro sections of the graphical user interface and the connected application of the transitions and other settings, like different music volume, volume changes could also potentially be a part of the effect selection step of this embodiment of the instant invention. Additionally, and according to a preferred embodiment, when the recording starts the associated music will begin to play audibly for the user. Letting the user hear the music while the video is being recorded could potentially help him or her anticipate upcoming effects (which will be tied to identifiable changes in the character of the music), synchronize the action in the video with the music, know where the recording is with respect to the timeline without actually giving attention to the display screen of the recording device, etc.

The selected effects will be implemented in real time during the recording process 340. The background music associated with each style will define the run time of the recording process, that is, the user preferably will not be able to manually stop the recording process until a length of time equal to the run time of the music has been reached.

Throughout the run time of the music one or more effect markers will be defined. These effect markers represent locations in the music where the user can apply effects, which might be full screen effects or, depending on the style, the effect position markers might also be instructions to perform tasks such as stopping the recording, changing orientation (e.g., from horizontal to vertical), or pointing the recording device in a different direction, and thereafter continuing the recording process. During the video recording, the user might be able to generate a pleasing outro of the output video by selecting the outro user control. Absent that, the output video would be generated without an outro effect in some embodiments. After the recording has ended, the instant invention will present the output video to the user and allow the user to view and/or distribute the finished output video 360 in a next preferred step. The completed output video containing all the recording choices of the user will be immediately available for review or further processing by the user without a need to render it (e.g., in order to apply the selected video effects, transitions, etc.) since the effects will have been previously applied in real time during the recording of the video.

Figure 4:
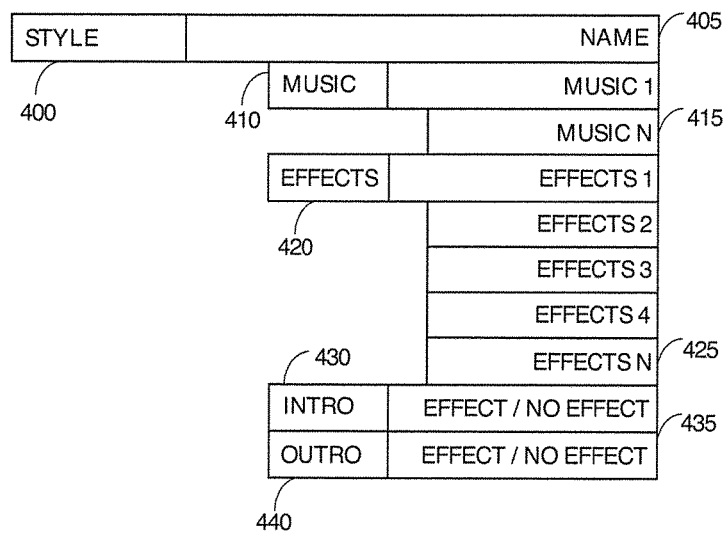
FIG. 4 illustrates a preferred data structure of the selectable styles of the instant invention.

FIG. 4 provides a summary of a preferred data structure for the styles of the instant invention. Preferably each of the styles 400 is stored in a database that is supplied by the inventors to the user. The name 405 of each of each style will be stored in the database. Furthermore a number of individual categories will also be defined for each of the styles. These categories could include music 410, effects 430, intro 440, and outro 450. Within each of these categories data is stored, data that makes up the selected style. So, for example, there is the music category, which is intended to be used to provide the background music of the selected style and might comprise one single clip or a number of background music clips 415. Additionally, the run time 420 of the potential output video will be stored in the music category in some embodiments.

Examples of the sorts of effects that might be selectable include all types of transitions, initiating color changes (abrupt or gradual), adding grain, modifying the video saturation, creating an artificial glow, changing the video to grey scale (black and white), producing heat maps, cross processing, posterizing, modifying the focal zoom, adding blur, and/or adding overlays such as borders, text, graphic images, etc. The effects also come with a predefined run time on which they will be applied; additionally the user will be able to control the running time of the effect by de-selecting the effect control in the graphical user interface.

According to an embodiment, the audio component of the style will be a defining element in the video generation process. The run time of the output video is defined by the duration of the audio material and, furthermore, a number of marker positions 425 will be defined within the style, with the marker positions being positioned at musically relevant sections of the audio material.

The effects category preferably will contain a listing of the effects that are associated and selectable with the style. Even though the example of FIG. 2 contains four selectable effects, that is not intended to be a limitation of the instant invention and potentially any number of associated effects (more or less than four) might be applied.

The styles might contain a number of different effects 435. For the categories "intro" and "outro", an embodiment of the instant invention preferably stores if either an effect, for example, a specific transition or no effect 445 is part of the specific style for the intro or outro section.

Figure 5:
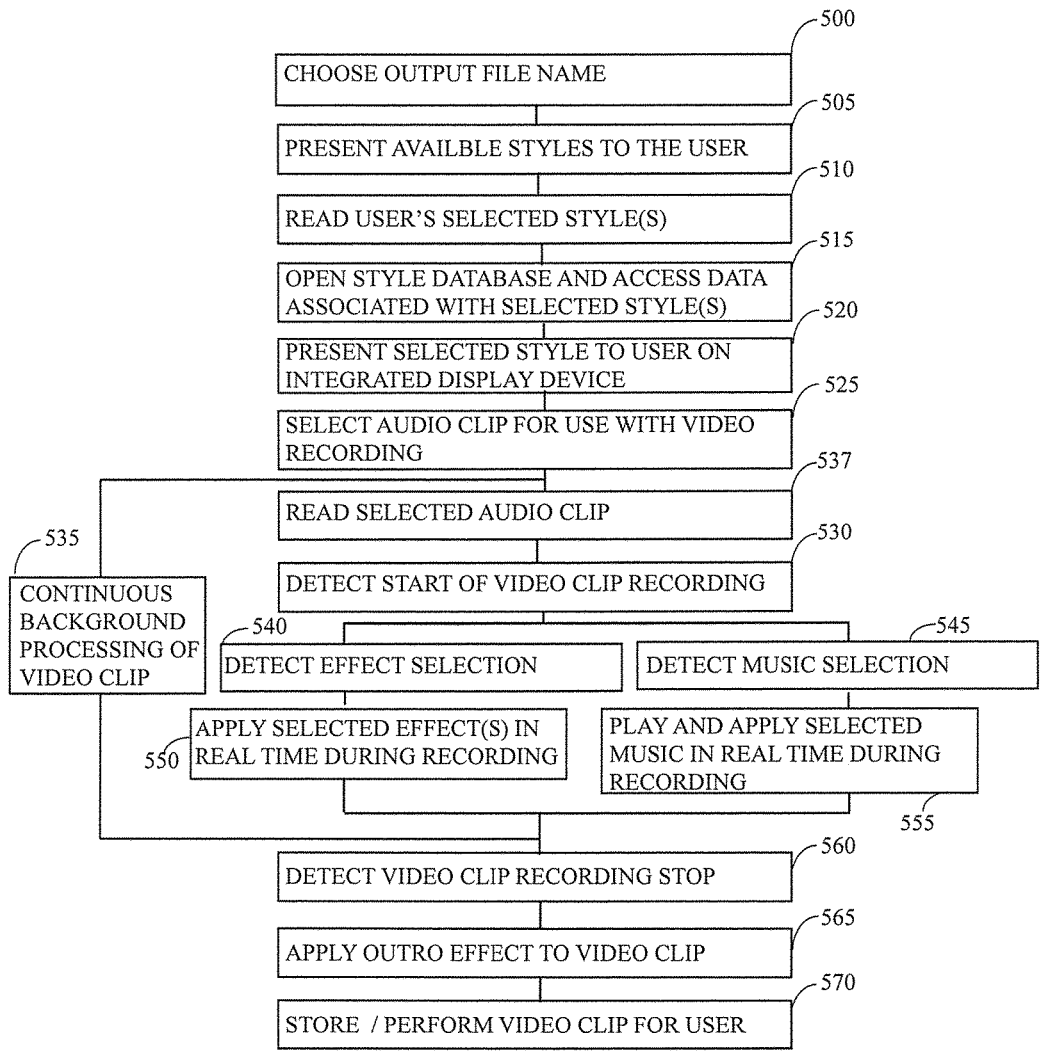
FIG. 5 depicts an example of a preferred workflow of the instant invention showing the actions of instant invention internally.

FIG. 5 shows a workflow of an embodiment of the instant invention and illustrates certain internal processes that could be initiated by the interactions of the user with the graphical user interface when working with the instant invention. In a first preferred step the instant invention will allow the user to select an output file name 500. As a next preferred step, the invention will open and provide the user with selection of stored styles 505. This will preferably be combined with a short on-screen preview of the settings that are associated with each style so that the user can quickly determine his or her desired style. The selected style will then be detected by the instant invention in the next step 510.

In a next preferred step, the instant invention opens the style database and reads data associated with the selected style 515. Note that the style database might be a conventional (hierarchical, relational, etc.) database or merely one or more flat computer files. In the next preferred step, the invention automatically fills the appropriate sections of the graphical user interface 200 with the information 520 associated with the selected style. According to an embodiment, the integrated display screen of the handheld video recording device will be used to display to the user what the style will look like when applied to a video work. In the case of a tablet or phone with a built-in video camera, this would be the device's display. In the case where the device that is used is a digital video camera (or a digital still camera that has an integrated video recording function), the selected style will be presented within the camera view finder and/or via an integrated LCD panel which might be located on the back of the camera or elsewhere depending on the brand and type of camera. The on-screen representation might be a still image with the style superimposed (e.g., if the selected style were a "birthday party style" the recorded video might be framed by a birthday cake, etc.) or a short demonstration video (potentially provided by the software developer) which illustrates how the style would appear when applied to a video recording.

In a next preferred step, an audio clip (music) associated with the selected style 525 will be selected. In step 537 the data associated with the selected music will be accessed. In some embodiments the music or other audio clip will be determined by the selected style. In other words, a music clip, or in some instances multiple music clips, will have been previously identified by the creator of the style, one of which will be automatically associated with it when the user selects that style.

Next, the run time of the output video will be determined 527, where the run time of the music associated with the selected theme determines the run time of the output video. That is, in this embodiment, the length of the selected music will determine how long a video may be recorded and, thus, the length of the recorded/output video. When the end of the selected music item is reached, the video processing will end although the user might continue to record unedited video beyond that point. This might be particularly useful, for example, if the user has selected "generic music video" as a style.

In a next preferred step, effect markers may be established at defined times within the style, the locations being displayed graphically via the graphical user interface 200 and afterwards or simultaneously the data associated with the selected style 525 will preferably be opened and populate the graphical user interface. In some cases the times at which the effect markers (if any) will be inserted will be determined by the software designer and may be specific to a selected style. In some cases, the marker positions (if any) will be chosen to coordinate with dynamic or other changes in the associated music.

In a next preferred step, the instant invention will detect the initiation of the recording of the video by the user 530. After the recording has started, the instant invention continuously monitors for user selections, for example, a selection of the intro control 535, the effects 545 and the outro control 555 by the user could be made. The instant invention preferably applies the associated intro 540 and outro settings 560 to the video track of the video recording and applies or implements the selected effects at the marker positions 550 in real time to the video clip as the video is recorded. In brief, the instant invention will implement a continuous background processing 570 of the video clip incorporating the selections and actions of the user into the output video as directed. As a last step, an output video 565 containing the selected effects to the user will be stored within the device memory, an attached storage, remote storage, etc.

In some embodiments the audio/music associated with a theme will be played so that the user will be able to hear it during the recording process (step 555). In such an instance, rather than watching for on-screen textual or other prompts that effects changes/placement are pending, the user would be able to anticipate where the camera should next be aimed based on the previously assigned effects changes associated with changes in the music. Said another way, if the user knows that a potential effect change will take place at the beginning of the chorus of a song, the user will be able to plan on the next camera move (e.g., pan, zoom, etc.) in advance of the beginning of a new effect.

In some embodiments the music, rather than be combined in real time with the audio track of the video recording, will be combined with the audio track after the recording has been completed. In that case it would be preferred, but not required, that the music be played for the user during the recording. For purposes of the instant invention, the term "integrated" (e.g., "the music track is integrated into the audio track") will be generally used to indicate that either the music clip will be added to the recorded audio track as background music or it will replaced the recorded audio track which will then become music-only.

Finally, an embodiment of the invention is meant to be a quick and easy method of generating short videos—music videos that can be generated while a user is out and about with friends, at a party, at a family gathering, etc. Because the run time is intentionally kept short it can be easily shared with social networks.

As a specific example of how the instant invention might operate in practice according to some embodiments consider how a "Birthday" theme might work. In this example, the theme will be associated with the traditional "Happy Birthday" song which has a run time of about 15 seconds depending on the tempo (or 30 seconds if sung twice). Thus, a video that is shot using this theme will end at 15 (or 30) seconds and have the "Happy Birthday" song as a background audio. In this example, the first marker might be placed at the first occurrence of the words ". . . to you . . . ", the second marker at the second occurrence, the third marker at ". . . happy birthday dear NAME . . . ", and the fourth marker at the last ". . . to you.". In other words, the markers will be timed to match events in the music. The selectable effects that could be applied in real time at these markers might include, for example, overlays like candles, a cake with candles, raining confetti, a color change from black-and-white to color, or an overlay of a crown. Each of the effects will be applied for a predefined period of time—for example 5 seconds or they will be changed as soon as the user selects a different effect or a different marker is reached.

In summary, an embodiment of the instant invention provides a highly creative work method for both novice and professional user by introducing editing during recording of video material. The instant invention adapts video editing to the fast living world of the mobile devices, allowing the user to instantly generate uniquely edited video clips in real time and furthermore still requiring a focused approach and some amount of skill from the user, primarily because of the dynamic nature of the instant invention.

CONCLUSIONS

Applicant reserves the right to pursue at a later date any previously pending or other broader or narrower claims that capture any subject matter supported by the present disclosure, including subject matter found to be specifically disclaimed herein or by any prior prosecution.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is also to be understood that where the claims or specification use "a" or "an" to refer to an element, such reference is not be construed that there is only one of that element.

Where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Unless indicated otherwise, methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the range ending with that number (which may be a range having 1 or 0 as its lower limit or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

While this invention is susceptible of embodiments in many different forms, there is shown in the drawings, and is herein described in detail, some specific embodiments. It should be understood, however, that the present disclosure is to be considered an exemplification of the principles of the invention and is not intended to limit it to the specific embodiments or algorithms so described. Those of ordinary skill in the art will be able to make various changes and further modifications, apart from those shown or suggested herein, without departing from the spirit of the inventive concept, the scope of which is to be determined by the following claims.

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as if fully set out at this point.

Reviewers of the prosecution history of any parent, child or related case shall not reasonably infer that the applicants have made any disclaimers or disavowals of subject matter in the present case based on disclaimers or disavowals in such parent, child, or related case.

It should be noted that where reference is made herein to a method comprising two or more defined steps, the defined steps can be carried out in any order or simultaneously (except where context concludes that possibility), and the method can also include one or more other steps which are carried out before any of the defined steps, between two of the defined steps, or after all of the defined steps (except where context concludes that possibility).

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of performing a video work, comprising the steps of:
   a. identifying a music clip, said music clip having a time duration associated therewith;
   b. determining a plurality of markers within said music clip, each of said plurality of markers corresponding to a time where a change in a character of said music clip occurs;
   c. identifying a plurality of video effects;
   d. identifying a theme;
   e. transmitting electronically said music clip, said plurality of markers, said theme, and said plurality of video effects to a portable electronic device, said portable electronic device having a video camera integral thereto;
   f within said portable electronic device having a video recording device integral thereto,
      (i) requiring a user to select said theme, thereby also selecting said music clip and said plurality of markers;
      (ii) requiring the user to initiate a video recording using said video recording device, thereby creating a recorded video, said recorded video having a video track and an audio track;
      (iii) applying said theme to said video track in real time as it is recorded;
      (iv) integrating said music clip with said audio track of said recorded video track in real time as it is recorded;
      (v) during said recording of said recorded video, allowing the user to select at least one of said plurality of video effects;
      (vi) during said recording after the user has selected one of said at least one video effects, beginning to apply said selected video effect at a next occurring time associated with one of said plurality of markers;
      (vii) stopping recording after a period of time equal to said time duration associated with said music clip has elapsed, thereby creating said video work;
   g. performing at least a part of said video work for the user.

2. The method according to claim 1, wherein step (iv) comprises the step of:
   (1) replacing said audio track with said music clip.

3. The method according to claim 1, wherein step (iv) comprises the step of:
   (1) replacing said audio track with said music clip in real time as it is recorded.

4. The method according to claim 1, wherein step (iv) comprises the step of:
   (1) combining said recorded audio track with said music clip.

5. The method according to claim 1, wherein step (iv) comprises the step of:
   (1) integrating said music clip with said recorded audio track of said recorded video track in real time as it is recorded, and
   (2) audibly performing said music clip for the user as the video track is recorded.

6. The method according to claim 4, wherein step (iv) comprises the step of:
   (1) integrating said music clip with said audio track of said recorded video, and,
   (2) playing said music clip for the user as the recorded video is recorded.

7. The method according to claim 1, wherein step (g) comprises the steps of:
   (g1) writing said video work to storage,
   (g2) reading at least a portion of said stored video work, and,
   (g3) performing said read portion of said stored video work for the user.

8. The method according to claim 1, wherein at least one of said plurality of video effects is an instructional effect.

9. The method according to claim 8, wherein said instructional effect instructs the user to perform a task with said portable electronic device, said task being chosen from the group consisting of a change in the video recording device orientation, a change in a direction the video recording device is pointed, and an option to insert a media item stored within said portable electronic device into recorded video at one of said markers.

10. The method according to claim 8, wherein each of said at least one video effect is selected from the group consisting of a fade, a wipe, a transition, an animation, a color change, an anti-shake correction, and an overlay.

11. The method according to claim 1, wherein said plurality of video effects includes at least one instructional effect and at least one perception changing effect.

12. The method according to claim 1, wherein at least one of said plurality of video effects is associated with at least one of said plurality of markers.

13. A method of creating a video work within a programmable portable device having a video camera integral thereto, comprising the steps of:
  a. within said programmable portable device,
    i. requiring a user to select a video theme, said video theme having a music clip and at least one effect associated therewith, said video theme having a plurality of markers associated therewith, each of said plurality of markers having a time of occurrence chosen to coincide with a change in a character of said music clip, wherein said at least one effect is associated with at least one of said plurality of markers;
    ii. requiring the user to select at least one marker and at least one effect associated with said selected at least one markers;
    iii. recording video information using said video camera, said video information including both a recorded video track and a recorded audio track;
    iv. as said video information is recorded, adding said music clip to said recorded audio track in real time;
    v. as said video information is recorded, when a run time associated with each of said selected at least one marker is reached, adding each of said selected video effect to said video track;
    vi. continuously recording video information according to steps (v) and (vi) until a length of time has elapsed as long as a length of said music clip; and,
    vii. storing said recorded video track and said audio track; and,
  b. reading at least a portion of said stored modified video clip; and,
  c. performing said read portion of said stored modified video clip for the user.

14. The method according to claim 13, wherein step (iv) comprises the step of:
  (1) replacing said audio track with said music clip.

15. The method according to claim 13, wherein step (iv) comprises the step of:
  (1) combining said recorded audio track with said music clip so that said recorded audio track and said music clip can be heard together.

16. The method according to claim 13, wherein step (iv) comprises the step of:
  (1) integrating said music clip with said recorded audio track of said recorded video track in real time as it is recorded, and
  (2) audibly performing said music clip for the user as the video track is recorded.

17. The method according to claim 15, wherein step (iv) comprises the step of:
  (1) integrating said music clip with said audio track of said recorded video as it is recorded, and
  (2) playing said music clip for the user as the recorded video is recorded.

18. The method according to claim 13, wherein at least one of said at least one effects is an instructional effect.

19. The method according to claim 18, wherein said instructional effect instructs the user to perforin a task with said programmable portable electronic device.

20. The method according to claim 13, wherein each of said at least one video effect is selected from the group consisting of a fade, a wipe, a transition, an animation, a color change, an anti-shake correction, and an overlay.

21. The method according to claim 13, wherein said video theme has a plurality of effects associated therewith and wherein said plurality of effects includes at least one instructional effect and at least one perception changing effect.

22. A method of creating a video work within a programmable portable device having video recording capability integral thereto, comprising the steps of:
  a. within said programmable portable device,
    i. requiring a user to select a video theme, said video theme having a music clip and at least one effect associated therewith, said video theme having a plurality of markers associated therewith, each of said plurality of markers having a time of occurrence chosen to coincide with a change in a character of said music clip, each of said plurality of markers having an associated effect;
    ii. recording video information using said video recording capability, said video information including both a recorded video track and a recorded audio track;
    iii. as said video information is recorded, adding said music clip to said recorded audio track in real time;
    iv. as said video information is recorded, requiring a user to select at least one effect to be utilized at the location of one of said markers;
    v. as said video information is recorded, when a marker is reached that has a selected effect associated with it, adding said effect to said video track in real time;
    vi. continuously recording video according to steps (iii), (iv) and (v) until a length of time has elapsed as long as a length of said music clip; and,
    vii. storing said recorded video track and said audio track; and,
  b. reading at least a portion of said stored modified video clip; and,
  c. performing said read portion of said stored modified video clip for a user.

23. The method according to claim 22, wherein step (iii) comprises the step of:
  (1) replacing said audio track with said music clip.

24. The method according to claim 22, wherein step (iii) comprises the step of:
  (1) combining said recorded audio track with said music clip so that said recorded audio track and said music clip can be heard together.

25. The method according to claim 22, wherein step (iii) comprises the step of:
  (1) integrating said music clip with said recorded audio track of said recorded video track in real time as it is recorded, and
  (2) audibly performing said music clip for the user as the video track is recorded.

26. The method according to claim 22, wherein step (iii) comprises the step of:
  (1) integrating said music clip with said audio track of said recorded video as it is recorded, and (2) playing said music clip for the user as the recorded video is recorded.

27. The method according to claim 22, wherein each of said at least one effects is selected from the group consisting of an instructional effect and a perception changing effect.

28. The method according to claim 22, wherein at least one of said at one effect is an instructional effect, and wherein said instructional effect instructs the user to perform a task using said programmable portable device, said task being chosen from the group consisting of changing an orientation of the video recording device, changing a direction the video recording device is pointed, and selecting a media item stored within said portable electronic device to insert into said recorded video track at one of said plurality of markers.

29. The method according to claim 22, wherein each of said effect associated with a marker is selected from the group consisting of a fade, a wipe, a transition, an animation, a color change, an anti-shake correction, and an overlay.

30. A portable computing device at least for creating a video work, comprising:
    a. a housing;
    b. a video camera within said housing;
    c. a speaker within said housing;
    c. a display integral to said housing;
    d. memory;
    e. a CPU in electronic communication with said video sensor, said speaker, said memory, and said display, said CPU being at least programmed to perform a plurality of computer instructions stored in said memory, said plurality of computer instructions comprising the steps of:
       i. requiring a user to select a video theme, said video theme having a music clip and effects associated therewith, said video theme having a plurality of time markers associated therewith, each of said plurality of markers having a time associated with said music clip and each of said plurality of markers being associated with an event in the music;
       ii. selecting at least one effect at the location of said time markers;
       iii. beginning to perform said audio work within hearing of the user;
       iv. beginning to record video information using said video camera, said video information including both a video track and an audio track;
       v. as said video information is recorded, integrating said music clip with said audio track in real time;
       vi. as said video information is recorded and as each of said plurality of markers is reached, applying said selected effect to said video track;
       vi. continuously recording video according to steps (v) and (vi) until a length of time has elapsed as long as a length of said music clip; and,
       viii. storing said recorded video track and said audio track; and,
    b. reading at least a portion of said stored recorded video clip; and,
    c. using said display to perform said read portion of said stored recorded video clip for the user.

31. A portable computing device according to claim 30, wherein said portable computing device is selected from the group consisting of a cellular phone, a tablet computer, a digital camera, and a digital video camera.

32. A portable computing device according to claim 30, wherein step (v) comprises the step of:
    (1) as said video information is recorded, replacing said audio track with said music clip in real time.

33. The method according to claim 30, wherein step (v) comprises the step of:
    (1) as said video information is recorded, combining said recorded audio track with said music clip so that said recorded audio track and said music clip can be heard together.

34. The method according to claim 30, wherein step (v) comprises the step of:
    (1) integrating said music clip with said recorded audio track of said recorded video track in real time as it is recorded, and
    (2) audibly performing said music clip for the user as the video track is recorded.

35. The method according to claim 30, wherein step (v) comprises the step of:
    (1) integrating said music clip with said audio track of said recorded video as it is recorded, and,
    (2) playing said music clip for the user as the recorded video is recorded.

36. The method according to claim 30, wherein each of said effects associated with one of said plurality of markers is either an instructional effect and a perception changing effect.

37. The method according to claim 36, wherein said instructional effect instructs the user to perform a task with said programmable portable device.

38. The method according to claim 30, wherein each of said effects associated with one of said plurality of markers is selected from the group consisting of a fade, a wipe, a transition, an animation, a color change, an anti-shake correction, and an overlay.

* * * * *